(12) United States Patent
Ash et al.

(10) Patent No.: US 7,647,418 B2
(45) Date of Patent: Jan. 12, 2010

(54) REAL-TIME STREAMING MEDIA MEASUREMENT SYSTEM AND METHOD

(75) Inventors: Leslie E. Ash, Golden, CO (US);
Michael F. Wiebel, Arvada, CO (US);
Darren R. Elven, Longmont, CO (US);
Christopher L. Burton, Lafayette, CO (US); Ryan P. B. Lee, Boulder, CO (US); Michael Thomas, Littleton, CO (US)

(73) Assignee: Savvis Communications Corporation, Town & Country, MO (US)

( * ) Notice: Subject to any disclaimer, the term of this patent is extended or adjusted under 35 U.S.C. 154(b) by 1370 days.

(21) Appl. No.: 10/174,481

(22) Filed: Jun. 19, 2002

(65) Prior Publication Data
US 2003/0105604 A1    Jun. 5, 2003

Related U.S. Application Data

(60) Provisional application No. 60/299,375, filed on Jun. 19, 2001.

(51) Int. Cl.
*G06F 15/16* (2006.01)
(52) U.S. Cl. .................................. 709/231; 725/87
(58) Field of Classification Search ............... 709/231, 709/223–224, 217; 725/91, 131, 87
See application file for complete search history.

(56) References Cited

U.S. PATENT DOCUMENTS

| | | | |
|---|---|---|---|
| 5,434,860 A | 7/1995 | Riddle | |
| 5,742,762 A | 4/1998 | Scholl et al. | |
| 5,864,678 A | 1/1999 | Riddle | |
| 6,021,437 A * | 2/2000 | Chen et al. | 709/224 |
| 6,377,972 B1 * | 4/2002 | Guo et al. | 709/201 |
| 6,385,609 B1 | 5/2002 | Barshefsky et al. | |
| 6,438,592 B1 * | 8/2002 | Killian | 709/224 |
| 6,466,980 B1 * | 10/2002 | Lumelsky et al. | 709/226 |
| 6,651,103 B1 * | 11/2003 | Markowitz et al. | 709/231 |
| 6,678,250 B1 * | 1/2004 | Grabelsky et al. | 370/241 |
| 6,751,673 B2 * | 6/2004 | Shaw | 709/231 |
| 6,769,024 B1 * | 7/2004 | Natarajan et al. | 709/224 |

(Continued)

OTHER PUBLICATIONS

PCT/US02/19338, International Search Report, mailed Sep. 25, 2002.

(Continued)

*Primary Examiner*—Salad Abdullahi
(74) *Attorney, Agent, or Firm*—Kenyon & Kenyon LLP (57) ABSTRACT

Systems and method for measuring parameters of a media stream are disclosed. Some example systems include a data collection agent that selectively couples with at least one user-designated media stream and collects data associated with the media stream. The example systems may further include a web server that communicates with at least one data collection agent. The web server may obtain a request from a user for measurement of a user-designated media stream, the user request including an identification of the media stream and a list of one or more performance parameters of said stream to be measured. The data collection agent receives from the web server a parameter set defining a measurement of the user-designated media stream, collects and measures media stream data according to the parameter set, and provides the user with real-time performance characteristics.

20 Claims, 4 Drawing Sheets

U.S. PATENT DOCUMENTS

| | | | |
|---|---|---|---|
| 6,848,004 B1* | 1/2005 | Chang et al. | 709/232 |
| 7,010,598 B2* | 3/2006 | Sitaraman et al. | 709/224 |
| 7,197,557 B1* | 3/2007 | Asar et al. | 709/224 |
| 7,233,578 B1* | 6/2007 | Shaffer et al. | 370/252 |
| 7,240,358 B2* | 7/2007 | Horn et al. | 725/87 |
| 2002/0042823 A1* | 4/2002 | DeBettencourt et al. | 709/224 |
| 2002/0052968 A1* | 5/2002 | Bonefas et al. | 709/231 |
| 2002/0065922 A1* | 5/2002 | Shastri | 709/227 |
| 2002/0124098 A1* | 9/2002 | Shaw | 709/231 |
| 2002/0129123 A1* | 9/2002 | Johnson et al. | 709/219 |
| 2002/0138641 A1* | 9/2002 | Taylor et al. | 709/231 |
| 2002/0143852 A1* | 10/2002 | Guo et al. | 709/201 |
| 2002/0152284 A1* | 10/2002 | Cambray et al. | 709/218 |
| 2002/0162047 A1* | 10/2002 | Peters et al. | 714/5 |
| 2002/0184645 A1* | 12/2002 | Austin et al. | 725/107 |
| 2003/0005074 A1* | 1/2003 | Herz et al. | 709/216 |
| 2003/0135867 A1* | 7/2003 | Guedalia | 725/126 |
| 2003/0177503 A1* | 9/2003 | Sull et al. | 725/112 |
| 2004/0194142 A1* | 9/2004 | Jiang et al. | 725/96 |

OTHER PUBLICATIONS

PCT/US02/19338, Written Opinion, mailed Apr. 11, 2003.

* cited by examiner

REAL-TIME STREAMING MEDIA MEASUREMENT SYSTEM AND METHOD

The present application claims the benefit of the filing data of U.S. provisional application No. 60/299,375, filed Jun. 19, 2001 and entitled "Real-time Streaming Media Measurement System and Method."

FIELD OF THE INVENTION

This invention relates to measuring performance characteristics of at least one streaming media server over a network. More specifically, this invention provides a real-time systems and methods of providing users with streaming media performance characteristics.

BRIEF DESCRIPTION OF THE DRAWINGS

Various systems and methods designed in accordance with the embodiments of the invention are described herein with reference to the following drawings.

DETAILED DESCRIPTION

Streaming media is one of the fastest growing segments of the Internet economy and is reaching across many sectors of the market. Demand for both content and improved delivery of that content continues to accelerate as more companies learn how to effectively utilize streaming media. The growing interest likely stems from two of the advantages streaming has over other multimedia: on demand content and interactivity. With the rapid deployment of broadband and increased network capacity, the demand for streamed content will likely continue to increase as the cost of delivery decreases.

Generally, for multimedia files to be streamed, they must first be broken into packets and compressed. The packets are then delivered across a network before being decompressed on the client-side by a streaming media player, a process handled by a set of algorithms termed codecs (compression/decompression). Specialized streaming protocols, for example, open protocols RTSP (Real-Time Streaming Protocol), RTP (Real-Time Transfer Protocol), and proprietary protocols, for example, MMS (Microsoft Media Stream/Streaming/Service/Server) of Microsoft Corporation® of Redmond, Wash., handle the process of delivering the data across the network. By compressing the files before they are sent, streaming technology attempts to minimize the bandwidth requirements for delivery. By decompressing and rendering the data as the packets arrive, the process of streaming avoids the need to download enormous media files in their entirety before viewing them. There are numerous codecs technologies available, and considerable variation in the way these process the data in attempt to maximize the fidelity to the original data and simultaneously minimize demand on the network.

The quality of streamed content delivery is very important. End-users are arbiters of stream quality, and good streaming media content can make more of a positive contribution to a website if that content is delivered efficiently and effectively. End-user satisfaction with the streamed content can be impaired if streaming media content is consistently delivered slower than that of the competition. By the same rationale, end-user satisfaction with the streamed content is generally harmed if incomplete versions of a requested product are delivered. For streaming media, successful delivery generally means knowing bandwidth is sufficient and that networks are not dropping valuable packets of streaming data. When streams are delivered too slowly or incompletely, end-users may turn elsewhere for their content.

To meet the high performance standards expected by the typical Internet user and to overcome inherent limitations imposed by an Internet Protocol ("IP")-based network, the streaming media industry frequently explores innovative ways to improve delivery performance. For example, many are turning to content caching solutions, pushing their streamed content to the so-called "edges" of the network. Such solutions involve placing identical streamed content on servers at a different, additional locations than the origin server. Solutions such as these, (commonly referred to as "mirroring" content) provide a plurality of content-sites at different locations on the Internet, thus attempting to make the distance between a streaming server and the client requesting the content as short as possible. To determine the precise impact of content distribution solutions on performance, streaming performance may be reliably quantified and frequently monitored. Accordingly, it is sometimes advantageous for parties supplying the streaming media content (i.e., content providers) and the parties responsible for content delivery (i.e., content deliverers) to monitor existing quality levels.

To maintain a more reliable and better performing stream, the content deliverers can monitor performance for regular evaluation, but also diagnose several problems regarding, e.g., important measurement performance criteria regarding buffer overruns on routers, poor performance or interference on backbones, or the location of network problems (e.g. a backbone or the local server).

Various streaming media formats, e.g., RealMedia®, Microsoft® Windows Media, Apple Quicktime®, etc., report delivery statistics differently. For example, Apple Quicktime® format provides a performance metric for jitter, however, it does not provide a performance metric for current bandwidth. Such a lack of uniformity in reported performance metrics makes providing a synthetically composed single index value or "grade" for stream quality of little or no use should quality of service issues arise. Additionally, the variation in providing delivery statistics makes a single grade difficult if not completely impossible to obtain.

Conventionally, networks of Data Collection Agents ("DCAs") are distributed across the Internet backbone worldwide to measure web-page performance or streaming media performance. These DCAs are in numerous companies' backbones, such as Exodus, Sprint, GTE, AT&T and possible others.

DCAS are automated servers that receive a subscription (also known as a "configuration"). For web-page or streaming media measurement, the subscription generally includes but is not limited to the Uniform Resource Locator ("URL") of the data content, e.g., web-page or streaming media content, to test and the frequency of tests to be performed (e.g., nine times per hour). This subscription is set by a user in advance of receipt of the subscription by the DCA. Following receipt of a subscription, the DCA performs the requested tests to collect performance data for the URL identified in the subscription. The collected performance data are then sent to a database, which is typically held at a network location apart from the DCA.

Streaming media measuring DCAs are often Windows NT® servers. UNIX® servers may be used, but are often used to measure web-page performance and not streaming media.

Analyzing performance data at various locations using a plurality of DCAs allows users to pinpoint problem areas. For example, universally poor performance may indicate a problem on a local server supporting the content, while poor performance at only one or some locations may indicate a problem with the network(s) and not the local server. Web applications, such as SM-WEBPOINT and SM-WEBPOINT+ by Exodus Communications, Inc., a Cable & Wireless company ("Exodus") of Santa Clara, Calif., allow the user to view the subscription (or other URLs in the case of SM-WEBPOINT+) and a time series history of the performance data of the web-page. These applications provide Internet accessibility to users for performance criteria from their desired URL.

These web applications provide various tools for performance data measurement. For example, SM-WEBPOINT+ provides: TimeLine, TraceRoute, Ping and DNS ("Domain Name System") Lookup.

The TimeLine application measures every object on a web-page and indicates the type of object (e.g., text, graphics, etc.), where it originated, and its performance metrics.

The TraceRoute application reports the route to a subscribed URL's hosting site from one of the DCAs. Between any particular URL's hosting site and DCA are a number of routers that packets must travel through to get to their destination. It is this path of routers that TraceRoute plots.

Ping is a protocol for testing whether a particular computer is connected to the Internet by sending a packet to its IP address and waiting for a response. Ping computes round trip times and packet loss statistics.

Figure 1:
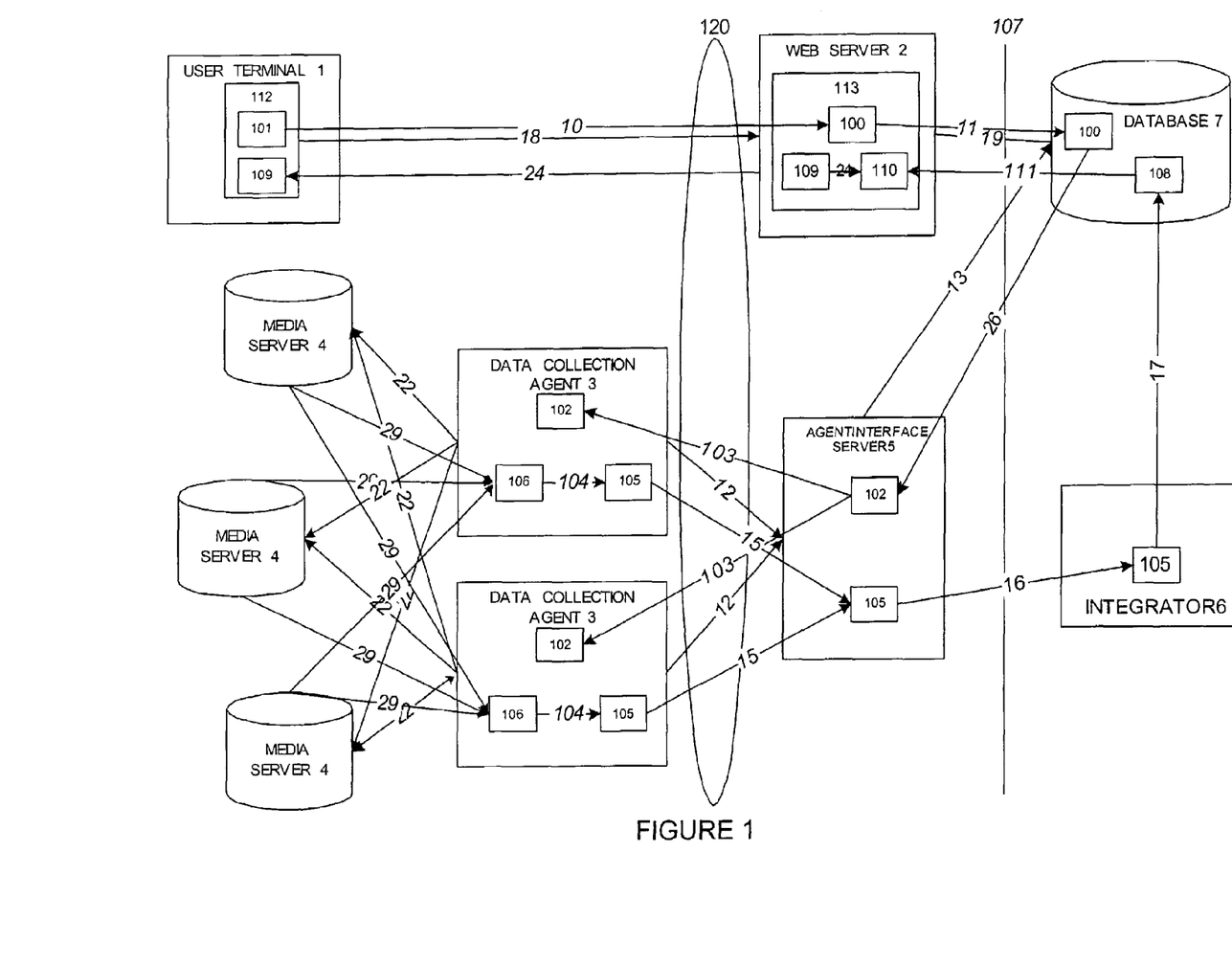
FIG. 1 illustrates a typical conventional non-real-time streaming media system.

FIG. 1 illustrates a non-real-time system and method for measuring streaming media performance, exemplifies the use of typical streaming media measuring techniques includes several operations. As illustrated in FIG. 1, operations of this system are typically performed in a serial order. First, (at 10) a user terminal 1 creates a subscription 100 in a web server 2 by entering subscription information 101, typically in a network browser 112. Subsequently, (at 11) using web application software 113 written, e.g., in a language such as VB (Visual Basic), Java or XML (Extensible Markup Language), the web server 2 receives and saves the subscription information 101 as a subscription 100 in database 7. This database 7, is capable of holding one or more subscriptions 100, and can be implemented using various formats including but not limited to a highly compressed comma delimited text format. The database 7 may or may not be located behind a firewall 107 for security purposes.

The subscription information 101 in the subscription 100 is then requested in (at 12) by a group of DCAs 3. Upon receiving the request, an agent interface server 5 queries the database 7 (at 13) for the subscription information 101 in the subscription 100. Upon receiving this query, the database looks up and sends the subscription information 101 in the subscription 100 to the agent interface server 5 (at 26). The agent interface server 5 then creates a configuration file 102 to the DCAs 3 (at 103).

A DCA 3 then queues the subscription information 101 in the configuration file 102. The queue need not be a first-in, first-out queue, but may alternatively be arranged in any way so as to ensure a proper number of measurements per time frame (e.g., nine per hour).

When the DCA 3 reaches a given request in the queue, it takes measurements from the streaming media servers 4 referenced in the subscription information 101 received in the configuration file 102. The frequency of the measurements is based on information received in the subscription information 101. To perform these measurements, the DCAs 3 connect to the stream (at 22), and the streaming media servers 4, in return, feed the stream to the DCAs 3 (at 29). The DCAs 3 need not render the stream—that is, convert the stream into its final form (e.g. audio and/or video). The DCAs 3 write the performance data 106 to a log file 105 (at 104) and then move on to measure the media stream for the next subscription in the queue.

The streaming media measurement can be pre-determined by the operator of the system not to exceed a given length of time, e.g., 90 seconds. This feature is important for monitoring long duration streams, such as full-time, 24-hours-a-day broadcasts.

The streaming media measurement will also stop if the stream itself terminates. For example, if the stream is from a 30 second sound clip, yet the measurement system is pre-set not to exceed 90 seconds, the streaming media measurement will terminate at the end of the 30 second sound clip stream. This ability to terminate frees the DCA to begin a media stream on the next URL in its queue.

The collected measurement data log files 105 are sent back to the agent interface server 5 (at 15).

At predetermined times, e.g., every hour, the agent interface server sends these measurement data log files 105 to an ingestor 6 (at 16), which is usually connected behind a firewall 107 for security purposes. After sending the log files 105 to the ingestor 6, the DCAs 3 and then the agent interface servers 5 request new configurations 102 for the next hour (or other predetermined time period) from the database 7.

The ingestor 6 then parses out the data and sends the measurement data 108 to the database 7 (at 17). Once the data reaches the database, it is immediately available to the user terminal 1.

When the user terminal 1 attempts to view a report 109 (at 18), at the end of a time period (e.g., after one day's worth of data collection), the web application software 113 queries the database 7 using the subscription information 101 in the subscription 100 and, in return at 111, receives the performance data in a record set 110. The web application software 113 then creates and displays a viewable report 109 for the user (at 24) showing all or part of the measurement data 106 collected by the DCAs 3. The user terminal 1 then attempts to view a report 109 (at 18).

The interface between the user terminal 1 and the web server 2, the interface between the web server 2 and the DCA 3 (or the DCA group), as well as the interface between the DCA 3 (or the DCA group) and the streaming media server 4 is often established through a network 120, such as, but not limited to, the Internet. When transmission over a network 120 occurs, the transition may pass through one or more routers, servers, etc. Also, the user terminal 1 often communicates with the web server 2 with a network browser 112. Some examples of network browsers 112 include Netscape Navigator®, Netscape Communicator®, Microsoft Internet Explorer®, and NCSA Mosaic®.

This sequence of events contains numerous operations and is also configured to only report data back at predetermined time intervals (e.g., at the end of an hour, day, week, etc.). Accordingly, it can be difficult for a user to obtain current information regarding the performance of a particular media stream. This latter deficiency of reporting back at intervals is inherent in conventional systems since the DCAs 3 queue measurement requests. Additionally, the system and method shown in FIG. 1 requires deployment of a relatively large number of components, which can be relatively costly and time-consuming.

As explained above, conventional measurement collection systems operate on a schedule, e.g., hourly, a master scheduler builds a list of subscriptions to monitor and then proceeds to work down the list, collecting measurement data on each subscription. Such systems may be designed only requiring one or a few media players (streaming media rendering engines) and the players would receive a new task from a master scheduler upon completion of each task. Thus, the scheduler would act on each subscription in a list of subscriptions in a serial manner. Such systems trade off simplicity of operation (one scheduler, one player, and one work list) with their inability to scale. For example, should the work list exceed what a single or a few players can measure in a certain period, e.g., an hour, the system would either have to refuse the work or replicate itself. It would be possible to replicate the system in another process but that merely increases the complexity of the system, making it more difficult to coordinate work, collect measurements, etc.

Furthermore, such system operation does not enable real-time or on-demand analysis. Should a real-time request enter the system, the scheduler would be forced to queue it ahead of other tasks. Nevertheless, the real-time task would still be forced to wait for the completion of the current task as pre-emption is not allowed. As media subscriptions typically take 90 seconds to collect a measurement the real-time task could easily end up waiting 45 seconds—not very "real-time" at all.

Embodiments of the present invention provide Real-Time Measurement ("RTM", also known as "real-time monitoring") systems and methods that provide faster ways to retrieve streaming media performance data than conventional systems and methods.

In accordance with embodiments of the invention, systems and methods are provided for performing real-time measurements of media streaming over networks, which allow users to obtain current performance statistics regarding a media stream.

In accordance with embodiments of the invention, the RTM systems and methods do not require users to enter a subscription.

In accordance with embodiments of the invention, systems and methods are provided that are much simpler and faster method of retrieving performance metrics for streaming media servers. Additionally, these metrics can be provided on demand, instead of at the end of a predetermined measurement cycle.

In accordance with embodiments of the invention, systems and methods are provided for measuring parameters of a media stream.

Some embodiments of the invention provide methods that measures data from a media stream by a DCA, and transmits data by the DCA to a web server via a direct through a socket connection.

In accordance with at least one embodiment of the invention, a system and method are provided for performing real-time measurements of media streaming over networks in "real-time," which allows a user to obtain current performance statistics regarding the media stream. The RTM system and method does not require that a user enter a subscription (unless used with an application requiring a subscription, e.g., SM-WEBPOINT). The user need only enter data indicating the URL and DCA into a web application to trigger performance of the desired measurement (unless used with an application requiring a subscription, such as SM-WEB-POINT). In such embodiments, the web application may establish a connection to the DCA and send the data associated with the desired measurement to the DCA. The DCA then may receive this data and attempt to perform the measurement. The DCA may then send the performance measurement data resulting from the performance of the measurement back to the web server without needing to first send it to an intermediary such as an ingestor or separate database. As a result, the user has access to the performance measurement data as soon as it is received by the web server. Such operation may be considered "real-time" in that there is no delay associated with an intermediary, e.g., ingestor or separate database operation.

In accordance with at least one embodiment of the invention, a system and method are provided that is much simpler and faster method of retrieving performance metrics for streaming media servers because there is no need for an intermediary (ingestor or separate database). Additionally, these metrics can be provided on demand, instead of at the end of a predetermined measurement cycle.

In accordance with at least one embodiment of the invention, a system and method are provided for measuring parameters of a media stream. The system includes a DCA configured to interconnect with at least one designated media stream and to collect data associated with the media stream, and a web server configured to communicate with a DCA. The DCA may be interconnected to the web server via a direct socket connection and receive data including a parameter set defining a measurement of a media stream from the web server supporting streaming of the media. The DCA may also be configured to collect media stream data according to the parameter set and measure data from a media stream.

At least one embodiment of the invention provides a system and method including a web server and a DCA, where the web server is connected directly through a network to the DCA, the DCA measures data from a media stream, and the DCA transmits the data to the web server.

At least one embodiment of the invention provides a method of measuring performance data of a media stream including providing the media stream from a streaming server, where the media stream is in a first format, the media stream being characterized by parameters. Subsequently, the media stream is received by a DCA interconnected with the streaming server. The parameters are then transfer from the DCA to a web server and subsequently transferred from the web server to a user terminal.

At least one embodiment of the invention provides a method that measures data from a media stream by a DCA, and transmits data by the DCA to a web server via a direct through a socket connection.

Figure 2:
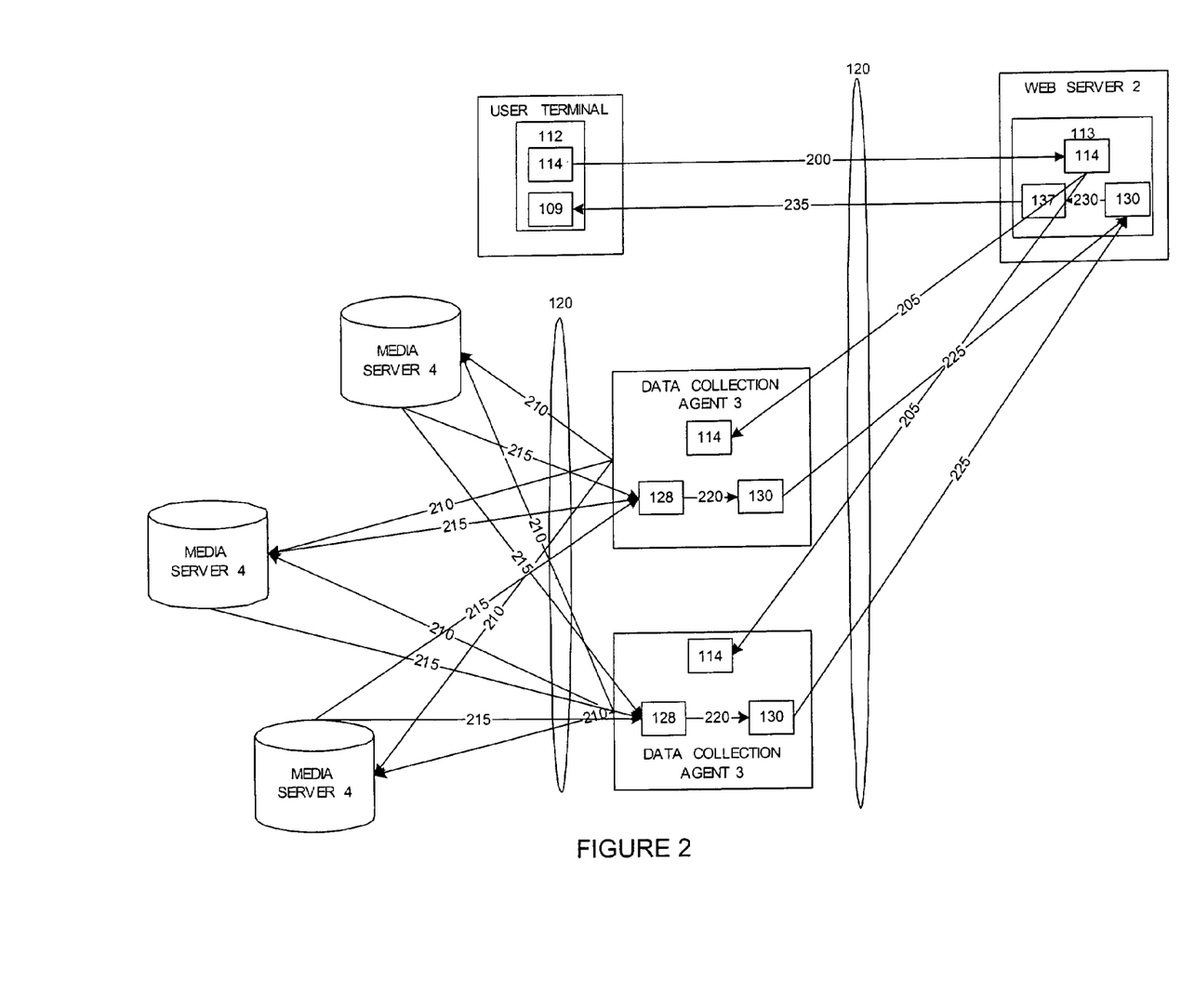
FIG. 2 illustrates an embodiment of the inventive real-time streaming media system.

FIG. 2 depicts, in a schematic diagram, a RTM streaming media measurement system designed in accordance with such an embodiment. FIG. 2 illustrates the minimal physical components of the system without the use of a subscription database (which is not required in the depicted embodiments). These components include the user terminal 1, which communicates with a web server 2, which in turn communicates with one or more DCAs 3 (although each DCA 3 is illustrated as a single computer, DCA 3 may also be a group of DCAs), which in turn contacts the streaming media server 4 and receives the media stream.

At least one embodiment of the inventive real-time streaming media measurement system (e.g., as depicted in FIG. 2) provides for the user to supply subscription information directly to the web server 2. In these embodiments, a user preferably enters real-time configuration information 114 into a user terminal 1. The user terminal 1 then transmits the real-time configuration information 114 to the web server 2, without the information being stored for any significant time in an intermediate database, such as the subscription database 25.

User terminal 1 may be implemented via any type of computing device including, but not limited to, a laptop or desktop personal computer (an MSDOS/Windows® PC, Macintosh®, etc.), supercomputer, handheld device (such as a PDA, web-enabled cellular phone, etc.) or any other device capable of communicating with a computer network. The user may interact with the user terminal 1 directly or indirectly. That interaction may occur, for example, via the user terminal 1 running a network browser 112 such as, but not limited to, Netscape® Navigator, Netscape Communicator®, Microsoft Internet Explorer®, or NCSA Mosaic®. The network browser 112 may utilize a Hypertext Transfer Protocol ("HTTP") client that is configured to download a web-page or other content from the web server 2 and render (e.g., display) the page for the user on the user terminal 1. The network browser 112 may also facilitate transmission of data from the user terminal 1 to the web server 2.

Figure 3:
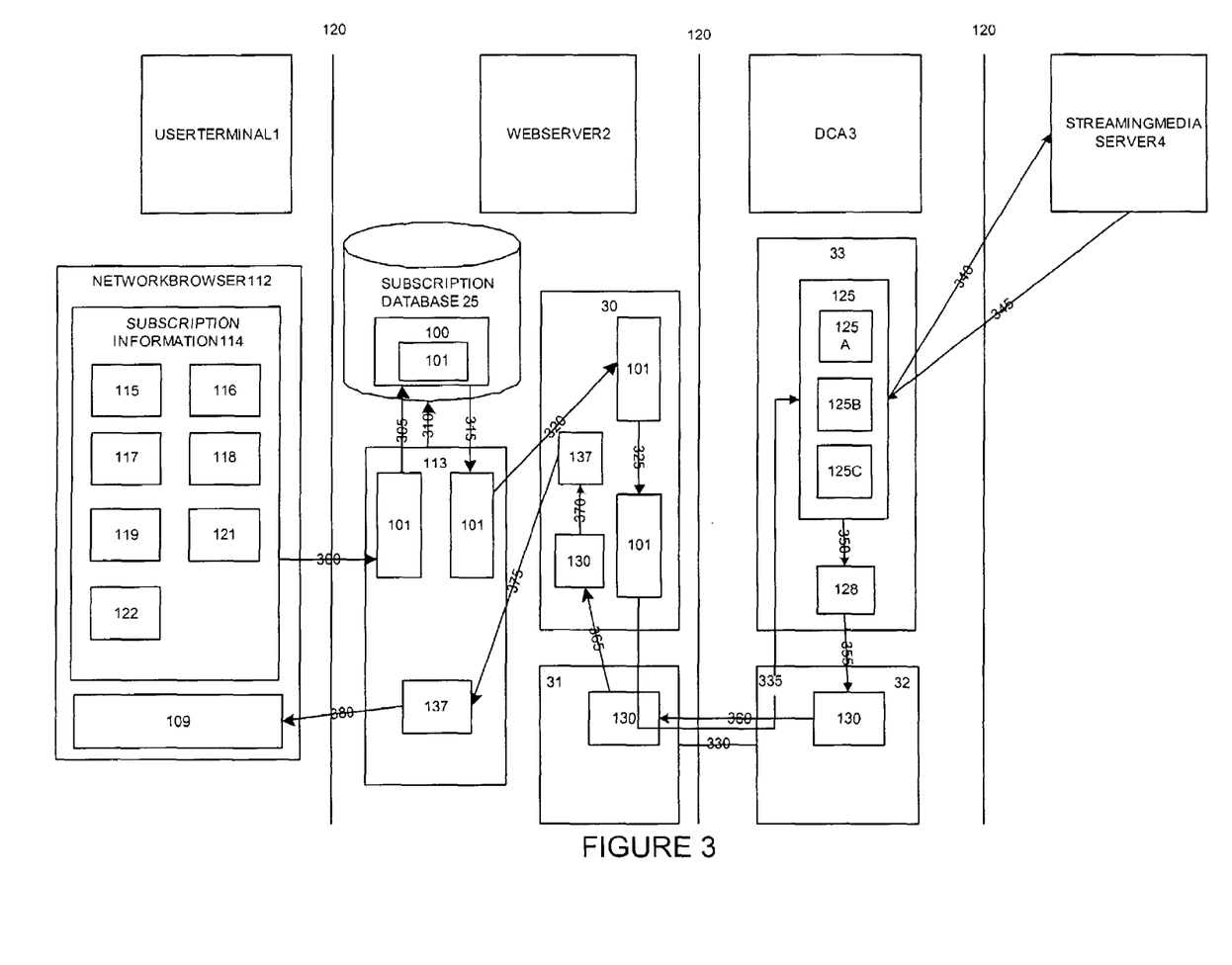
FIG. 3 illustrates an embodiment of the inventive real-time streaming media system using a subscription database.

The network 120, illustrated in FIGS. 2 and 3, through which the user terminal 1 may connect to web server 2, web server 2 may connect to DCA 3, and DCA 3 may connect to streaming media server 4, may be any appropriate distributed computer network such as, but not limited to, a LAN, WAN, MAN (metropolitan area network), VAN (value-added network), PAN (personal area network), PON (passive optical network), VPN, enterprise-wide network, direct connection, active network, control network, the Internet, an intranet, or any other suitable network. Furthermore, the connections between user terminal 1, web server 2, DCA 3, and streaming media server 4 need not be implemented through the same network or same type of network.

The user and the user terminal 1 may be physically located anywhere. The user and user terminal 1 do not even need to be physically located together. The user terminal 1 also need only be connected either directly, indirectly, or through a network 120 to the web server 2. If networked, communication is generally faster between the user terminal 1 and the web server 2 if these components are placed geographically closer together (meaning that fewer nodes lie between them) and if the connection speeds to the network 120 of the terminal 1 and server 2 are maximized, as well as the connection speeds between the nodes between terminal 1 and server 2.

Much like user terminal 1, the web server 2 may be implemented via any type of computer including, but not limited to a laptop or desktop personal computer (e.g., running MSDOS/Windows 3.1®/Windows 95®/Windows 98®/Windows 2000®/Windows NT®, UNIX®, LINUX/etc. PC, Macintosh®, etc.), Virtual Address eXtension (VAX) terminal, workstation, handheld device (e.g., a PDA, web-enabled cellular phone, etc.) or any other device capable of communicating with a computer network. However, the physical web server 2 must also be capable of running web server software. The web server software is a program that, using, for example, a client/server model and, often but not always, HTTP, communicates with the network browser 112 to send data content to the user terminal 1. The web server software can be incorporated in a web application software 113 (such as SM-WEBPOINT+) running on the web server 2.

DCA (or DCA group) 3 is an agent capable of connecting to the web server 2 and the streaming media server 4. Connection to each of the web server 2 and the streaming media server 4 may be implemented using a network 120. As stated above, streaming media measuring DCAs 3 are often Windows NT® servers. UNIX® servers may also or alternatively be used, but are often used to measure web-page content delivery rather than streaming media delivery. Furthermore, servers running LINUX®, Solaris®, Irix®, Windows 2000®, Virtual Memory System (VMS), AIX, and any other suitable operating system may also be used.

Streaming media server 4 may be implemented, for example, using any server capable of delivering streaming media data and may also be configured to be able to connect to DCA 3. This connection to DCA 3 may be made either directly, through a network, or both. The streaming media server 4 may provide any type of media including but not limited to: audio, visual, a combination of audio and visual, virtual reality environments, text, live broadcasts of any form, person-to-person communications of any form, tele-medicine data, and other digital, analog, or other data.

FIG. 3 illustrates a system designed in accordance with at least one embodiment of the invention and including a subscription database.

At least one other embodiment of the invention (e.g., as depicted in FIG. 3) provides a system configured such that the user terminal 1 provides real-time configuration information 114 within subscription information 101 directly or indirectly to a subscription database 25 which stores the subscription information 101, and the web server 2 then looks up subscription information 101 from the subscription database 25 when appropriate. FIG. 3 depicts, in a schematic diagram, a system designed in accordance with such an embodiment of the inventive RTM streaming media measurement system using a database to store subscription information 101. FIG. 3 illustrates the physical components of the system in more detail including the user terminal 1, web server 2, DCA 3, and streaming media server 4. FIG. 3 also illustrates the subscription database 25 and examples of the software located on the user terminal 1, server 2, and DCA 3, and data flow between the database 25 software, and the streaming media server 4.

Subscription database 25 is a database that is accessible by the web server 2 and can store subscription information 101 received originally from the user terminal 1 or another appropriate source. Subscription database 25 is structured such that the web server 2 can also retrieve the subscription information 101.

Figure 4:
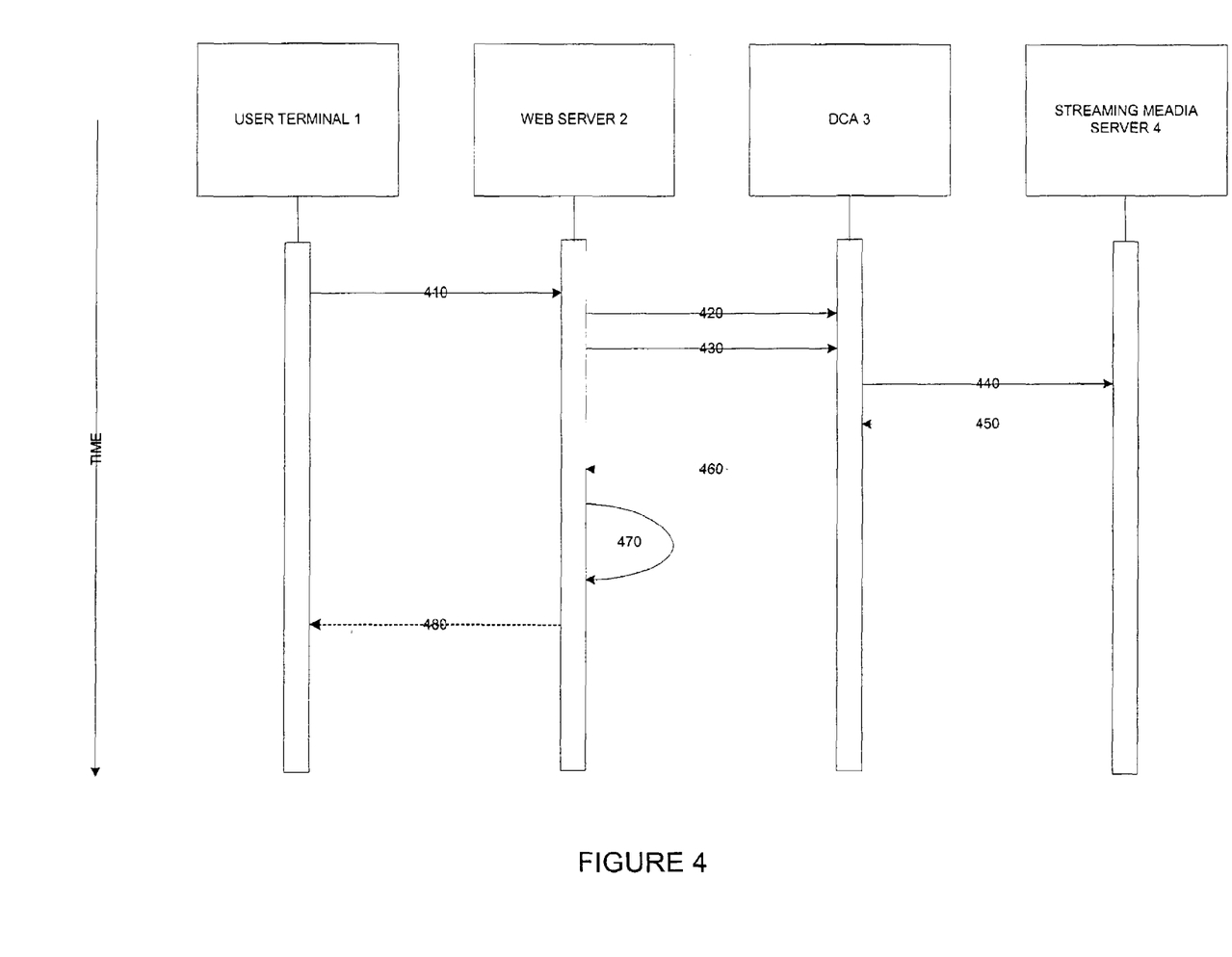
FIG. 4 illustrates a flow chart of an embodiment of a method of the inventive real-time streaming media system.

FIG. 4 depicts a flow chart of an embodied method of the inventive RTM streaming media measurement system without a database. FIG. 4 illustrates an example of an order of operations performed by a user, various servers, and the DCAs. The flow of operations performed by the user terminal 1 and other components in association with other components in the direction of the streaming media server 4 (referred to as "upstream operations") are shown in solid lines, whereas the later operations performed by the streaming media server and other components in association with other components toward the user terminal 1 (referenced to as "downstream operations") are indicated via dashed lines.

As illustrated in FIG. 4, at least an inventive process performed in accordance with at least one embodiment of the invention begins with the user terminal 1 issuing a real-time measurement request, which includes real-time configuration 114 (not illustrated specifically in FIG. 4) or subscription information 101 (not illustrated in FIG. 4), to the web server 2 (at 410). The web server 2 then connects to the DCA 3 (at 420) and sends the real-time configuration (at 430). At 440, the DCA 3 connects to the stream from the streaming media server 4. The streaming media server 4, then returns stream data to the DCA 3 (at 450). The DCA 3 returns measurement data from the stream to the web server 2 (at 460). The web server 2 then processes the measurement data (at 470) and displays the results to the user terminal 1 (at 480).

As illustrated in FIG. 2, at the beginning of monitoring, the user terminal 1 initiates a RTM request (at 200), e.g., via web browser 112, to the web application software 113 on the web server 2. In this request, the user 1 may submit a real-time configuration 114 including a URL (or any other identifier) to be monitored. The identifier may provide a unique indication of the media stream to be monitored which may allow the desired media stream to be located on the network 120.

Optionally, the user can indicate a DCA 3 or group of DCAs 3 to perform the monitoring requested in the real-time configuration information 114. This may be performed by indicating names or other identifiers such as, but not limited to, an agent's name, URL, IP address, etc. A user may wish to use a specific DCA for a measurement because it is geographically close, typically has low traffic, has reputably low downtime, or other because of various reasons.

If the user does not indicate a DCA 3 or DCA group to use, a default DCA 3 or DCA group may be assigned by either the user terminal 1, web server 2, any database accessible directly or indirectly by the web server, or an external source, such as, but not limited to, an administrator, DCA management system (not illustrated in FIG. 2), or other computer.

The real-time configuration information 114 is similar to subscription information 101, but need not include data such as monitoring frequency because the system may be configured to use the real-time configuration information 114 substantially instantaneous when entered by the user terminal 1, and not necessarily on occasion when retrieved from a database, such as subscription database 25 shown in FIG. 3.

However, the real-time configuration information 114 may also be encapsulated within the subscription information 101 if subscription information 101 is used by the system, and especially if subscription information 101 is stored by the system as a subscription 100. This is advantageous for many reasons including allowing the user to later refer to configuration information 114 by a name, label, code, abbreviation, or other identifier 115 to provoke a real-time measurement. The subscription information 101 encapsulating the real-time configuration information 114 may also be identical to the real-time configuration 114, itself, and not merely in values but also in the totality of information provided. Storing real-time configuration information 114 within subscription information 101 in a subscription 100 may also be helpful because it can facilitate the use of hybrid measurement systems that can perform regularly scheduled non-real-time measurements and provide non-real-time reports, as well as real-time measurements and substantially instantaneous reports, particularly when the later are requested by the user terminal 1.

In the embodiments illustrated in FIGS. 2 and 3, the web server 2 logs the request to begin monitoring. If the web server 2 is using a subscription-based web application 113, such as SM-Webpoint, as shown in FIG. 3, the application 113 will look up the previously-entered subscription information 101 in the subscription database 25 storing the real-time configurations 114 held within the subscription information 101 within the subscriptions 100.

Referring to FIG. 3, the subscription information 101 and/or the real-time configuration 114, separately or together, may contain, but are not limited to, a subscription name, label, code, abbreviation, or other identifier 115. After configuration of a number of subscriptions 100, a subscription name, label, code, abbreviation, or other identifier 115 allows a user to quickly and easily identify what media stream a specific subscription 100 monitors.

The subscription information 101 and/or the real-time configuration information 114, separately or together, may also contain target configuration information 116. The target configuration information 116 parameter provides specific information about the location on the network 120 of the streaming media server 4 the user wishes to monitor or it can simply identify if there is a permanent connection between the DCA 3 and the streaming media server 4. The target configuration information 116 may be provided as a URL, but may also be provided as a specific IP address or in any other form which may allow a DCA to uniquely identify and locate the desired media stream on the network. The target configuration information 116 may also be absent from the subscription information 101, which may trigger a default response by the web server 2, such as, but not limited to, not making any measurement, using the previously used target configuration information, using target configuration information of the most similar subscription information 101, or performing a self-test.

The subscription information 101 and/or the real-time configuration information 114, separately or together, may further include DCA information 117. The DCA information 117 may include, for example, identification of which DCAs 3, if any, are requested to perform the monitoring.

The subscription information 101 and/or the real-time configuration information 114, separately or together, may also contain a monitoring frequency 118. Regardless of the user's (or other person or thing setting the subscription information 101 and/or the real-time configuration information 114) monitoring frequency setting 118, the DCA 3 may still return the measurement data in real-time after every block of measurements. However, it is possible to set a frequency limit, above which the DCA 3 may temporarily store measurement data and return the data less frequently for efficiency. It is also possible to set the system, if properly configured, to a hybrid real-time/non-real-time function, providing for regularly scheduled non-real-time measurements and reports, yet capable of performing real-time measurements and providing real-time reports to the user terminal 1 on demand.

The subscription information 101, and/or the real-time configuration information 114, separately or together, also may include monitoring duration 119 and/or monitoring duration upper and/or lower limits 122. Although a default monitoring duration is generally set (e.g., a maximum of 90 seconds), a user may provide, directly or indirectly, a separate monitoring duration. If the user is willing to sacrifice reliability of streaming media performance data in exchange for the time spent collecting and processing the data, the user may adjust the maximum measurement time to a shorter time. However, if the user would rather endure a longer time spent collecting and processing the data in exchange for streaming media performance data, which more accurately reflects the media stream, the user may adjust the maximum measurement time to a longer time. The user may also submit no monitoring time duration and rely solely on the default time provided to the system if one is so provided.

It is also possible for the subscription information to include a user name and/or password 121. This feature can be particularly useful if the web server 2, DCA 3, streaming media server 4, or subscription database 25 requires any security. However, generally, for streaming media measurements, the only necessary data included in subscription information 101 are the monitoring frequency 118, target configuration information 116, a subscription name or label 115 if desired, and, also if desired, DCA information 117 identifying a DCA 3 or DCA group to perform the monitoring. Whereas, generally the only necessary data included in real-time configuration information 114 are target configuration information 116, and if desired, DCA information 117 identifying a DCA 3 or DCA group to perform the monitoring.

As illustrated in FIG. 2, the real-time configuration information 114 is transmitted by user terminal 1 to web server 2 (at 200) with the aid of a web browser 112 on the user terminal 1 to web application software 113. Subsequently, the web application software 113 translates all or necessary parts of the real-time configuration information 14 received from the user into a language the DCAs 3 can interpret. For example, the translated stream can be coded in Service Metrics Configuration (SMC) script, encapsulated in XML, placed in another suitable format, etc. The web application 113 then opens a socket connection between the web server 2 and the selected DCA 3 (at 205) or DCA group (or if no DCA or group of DCAs is selected, then to a default DCA or DCA group) creating a direct data feed through which the DCA 3 and web server 2 are able to send and receive data. Measurement and configuration data transmitted between web server 2 and DCA 3 may be transmitted, for example, through the socket connection.

After successfully connecting to the DCA 3, the web application sends the required elements of the real-time configuration 114 to the DCA 3. Components of the DCA 3 may be implemented as data transmission software running on DCA 3. If the DCA 3 is immediately busy, the DCA 3 obtains (either creating or retrieving an existing) a streaming media rendering engine and starts immediately. If the DCA 3 is not immediately busy when it receives the configuration information 114 and/or subscription information 101, it similarly begins to act on the configuration information 114 immediately.

When the DCA 3 gets to the request, the DCA 3 connects to the stream issued by the media server 4 (at 210) and the streaming media server 4, in return, feeds the stream to the DCA 3 (at 215). The DCA 3 need not render the stream to perform the measurements. After receiving the media stream and calculating the measurement data, components of the DCA 3 creates statistic objects 128 for RealMedia stream servers or SMWinMediaStream objects for WindowsMedia stream servers. (SMRealStatistic and SMWinMedia objects are collectively called SMStatistic objects.) The statistic objects 128 are encapsulated packets of information that have been recorded by the measurements.

The DCA 3 components then serialize the statistic objects 128 into a comma delimited format stream 130 (at 220). The DCA 3 then may transmit this stream 130 directly over the socket connection to the web server 2 (at 225) without needing to transmit it through an agent interface server, ingestor, or database; however, transmission to such components could be optionally performed if so desired. Performance data also need not be transferred to a log file or stored and held for any amount of time, although this could also be performed if so desired. Thus, an agent interface server and ingestor are not needed and any database, e.g., a subscription database, is only needed if the real-time configuration 114 is desired to be stored.

The web server 2 then (at 230) parses or deserializes the data into the objects, performs calculations, and builds a separate file 137 or transmits a separate stream in a suitable format, e.g., XML, JavaScript, etc. When the DCA 3 has sent the data back to the web server 2 or at least freed up the necessary media monitor 125, the DCA 3 may then proceed to measure the media stream for the next configuration/subscription in the queue, or wait for a configuration/subscription if no queue exists. Although DCAs 3 may handle only non-real-time measurement subscriptions or only RTM requests, the DCA 3 handling RTM requests could also be used for non-real-time measurement subscriptions when in downtime between RTM requests.

Once the web application 113 has formulated the final measurement data file 137, it may immediately display the results to the user terminal 1 via the web application 113 converting the final measurement data file 137 into a report 109 and sending the report 109, perhaps in a format such as HTTP to the user terminal 1 (at 235). This report could easily be viewed using a network browser 112 or other similar application.

As illustrated in FIG. 3, the real-time configuration information 114 is transmitted by user terminal 1 to web server 2 (at 300) and may be transmitted with the aid of a web browser 112 on the user terminal 1. As discussed above, the real-time configuration information may be encapsulated within subscription information 101 and passed to the web server 2 in its encapsulated form. This encapsulated transmission may be of particular utility when using a subscription database 25 or otherwise storing the configuration information 114.

If the real-time configuration information 114 is sent in a storable form, such as encapsulated in subscription information 101, and does not otherwise include instructions directing the web server 2 to store the real-time configuration information 114 in memory, the web application software 113 may transmit the real-time configuration information 114 to the subscription database 25 (at 305) or similar storage device, as a URL post string, an XML stream, or any other appropriate format.

If the real-time configuration information 114 has been stored in a subscription database 25, the web application software 113 (at 310) may request the real-time configuration information 114 from its storage location.

The real-time configuration 114 and/or subscription information 101 is then transmitted from the database (at 315) or directly or indirectly from the user (if not being retrieved from storage) (as at 300). Subsequently, the real-time configuration 114 may be transmitted (at 320) to a component 30 ("COM", e.g., a Microsoft® component architecture written in Java, referred to as a COM component herein merely for consistency and clarity and not to limit the component to COM or Java). This COM component 30 may be resident on or accessible by the web server 2 and run within or on the web application 113. The web application 113 may also route the real-time configuration 114 and/or subscription information 101 to any other suitable component in lieu of a COM component 30, if a COM component 30 is not available or if an alternative component is used.

The COM component 30 translates (at 325) all or necessary parts of the real-time configuration information 116 received from the user or the subscription information 101 into a language the DCAs 3 can interpret. For example, the translated stream can be coded in Service Metrics Configuration (SMC) script, encapsulated in XML, placed in another suitable format, etc.

A client monitoring routine module of the COM component 30 (RTMClientMonitor 31), then opens a socket connection between the web server 2 and the selected DCA 3 (at 330) or DCA group (or if no DCA or group of DCAs is selected, then to a default DCA or DCA group) creating a direct data feed through which the DCA 3 and web server 2 are able to send and receive data. Measurement and configuration data transmitted between web server 2 and DCA 3 may be transmitted, for example, through the socket connection.

After successfully connecting to the DCA 3, the client monitoring routine 31 sends the required elements of the real-time configuration 114 and/or the subscription information 101, such as the target configuration information 116, other configurables, and DCA settings 117 to MonitorServer 33 or the DynamicServer routine 32 (at 335). This information may then be routed to an appropriate media monitor 125.

MonitorServer 33 and the DynamicServer routine 32 may be implemented as data transmission software running on DCA 3. DynamicServer 32, in particular, may be implemented as software that primarily listens to the open socket port 123 and transmits information to the client monitor routine 31.

If the DCA 3 is immediately busy, the DCA 3 obtains (either creating or retrieving an existing) a streaming media rendering engine and starts immediately. If the DCA 3 is not immediately busy when it receives the configuration information 114 and/or subscription information 101, it similarly begins to act on the target configuration information 116 received from the real-time configuration 114 and/or subscription information 101 immediately.

Whether the target configuration information 116 is queued or not, when the DCA 3 gets to the request, the DCA's server monitor application 33, MonitorServer, will instantiate the appropriate media monitor 125, e.g., RealMediaMonitor 125a for RealMedia streams, WindowsMediaMonitor 125b for Windows Media streams, and QuicktimeMonitor 125c for Quicktime streams. A media monitor 125 for each protocol may be included in MonitorServer 33, which is server monitor application. MonitorServer 33 may contain, for example, one or more media monitors: RealMediaMonitor 125a, WindowsMediaMonitor 125b, and QuicktimeMonitor 125c. Alternative embodiments may be configured so any single media monitors, any combination of media monitors, or no media monitors are contained in the server monitor 33, but are instead located external to the server monitor 33. Regardless of their location, the media monitor 125 is configured to enable receipt of information from the streaming media server 4 and directly or indirectly communicate with the server monitor 33.

Selection of the specific media monitor to be used is based on information received from the COM component 30 or its subroutine 31. This information can be derived from the extension of the streaming media server URL in the target configuration information 116 or by separate information as submitted by the user (or user analog). Alternatively, the media monitor 125 can contact the streaming media server 4 and test the stream to determine which media monitor 125 to use.

The media monitor 125 then takes measurements from the streaming media servers 4 referenced in the target configuration information 116. To perform these measurements, media monitor 125 in the DCA 3 connects to the stream (at 340) and the streaming media server 4, in return, feeds the stream to the media monitor 125 in the DCA 3 (at 345). Neither the media monitor 125, nor the DCA 3 need render the stream to perform the measurements.

After receiving the media stream and calculating the measurement data, the media monitor 125 creates statistic objects 128 (at 350) such as but not limited to SMRealStatistic objects for RealMedia stream servers or SMWinMediaStream objects for WindowsMedia stream servers. (SMRealStatistic and SMWinMedia objects are collectively called SMStatistic objects.) The statistic objects 128 are encapsulated packets of information that have been recorded by the measurements.

The server monitor application 33 of the DCA 3 may then serialize the statistic objects 128 into a comma delimited format stream 130 (at 355). The server monitor application 33 (at 360) potentially via DynamicServer 32, transmits this stream 130 directly over the socket connection to the client monitor subroutine 31 and/or the COM component 30 on the web server 2 without needing to transmit it through an agent interface server, ingestor, or database; however, transmission to such components could be optionally performed if so desired. Performance data also need not be transferred to a log file or stored and held for any amount of time, although this could also be performed if so desired. Thus, an agent interface server and ingestor are not needed and any database, e.g., a subscription database, is only needed if the real-time configuration 114 is desired to be stored.

If the stream 130 was not sent directly to the COM component 30, the client monitoring subroutine 31 then returns the measurement data 130 to the COM component 30 (at 365). The COM object 30 on the web server 2 the parses or deserializes (at 370) the data into the objects, performs calculations, and builds a separate file or transmits a separate stream in a suitable format, e.g., XML, JavaScript, etc. This final measurement file 137 is then fed back into the web application itself (at 375). This communication between the (COM object 30 and the web application 113 can be performed through, e.g., XML or JavaScript, as stated, or it can use other formats if desired. The format may be determined by the Application Programming Interface ("API") function in the Java COM interface called by the web application.

When the DCA 3 has sent the data back to the web server 2 or at least freed up the necessary media monitor 125, the DCA 3 may then proceed to measure the media stream for the next configuration/subscription in the queue, or wait for a configuration/subscription if no queue exists. Although DCAs 3 may handle only non-real-time measurement subscriptions or only RTM requests, the DCA 3 could be used for non-real-time measurement subscriptions when in downtime between RTM requests.

Once the web application 113 has received the final measurement data file 137 from the COM object 30, it may immediately display the results to the user terminal 1 via the web application 113 converting the final measurement data file 137 into a report 109 and sending the report 109, perhaps in a format such as HTTP to the user terminal 1 (at 380). This report could easily be viewed using a network browser 112 or other similar application.

A more detailed description of the types of measurable performance criteria measured and analyzed by the systems and methods of the invention embodiments in now provided. Measurable performance criteria may include, but are not limited to, Domain Name System ("DNS") time, first stat time, buffering time, quantity of data received, jitter, percent packet loss, packet loss, packets received, packets late, packets resend requested, packets resend received, packets recovered, packets resent, packets received normally, access/network errors, content errors, service errors, current bandwidth, clip bandwidth, and bandwidth ratio (current bandwidth divided by clip bandwidth).

The DNS time is the time for the DCA 3 to execute a DNS lookup for the streaming media server 4. The first stat time is the length of time from the start time to when the first statistic object 128 is returned by the media monitor 125. The buffering time is the time the first packet arrives from the streaming media server 4 to the media monitor's buffer 125 until the end of the setup phase. The setup phase may include the time from the user request to when the stream data begins to be rendered. This includes all events to establish a connection to the stream and buffer time, including DNS Time and buffering time.

The quantity of data received is a measure of the absolute: amount of data gathered by the media monitor 125. This performance criterion is usually measured in a dimension such as bytes or bits. The packet loss metric is the number of packets that are not received by the media monitor 125. The percent packet loss metric is the percentage of total packets that are considered lost. The packets received metric is the total number of packets received by the media monitor 125. This is the sum of the normal and recovered packets. The packets late metric is the number of packets received too late to functionally render, if the stream had been rendered. The packets resend requested metric is the number of packets that have been requested to be resent in a unicast environment. This metric particularly applies to RealMedia streams.

The packets recovered metric is the number of packets for which some type of corrective action is taken. The corrective action is taken by the core module of the media player on the streaming media server 4. Corrective action may be understood to include requesting that the missing or broken packets be resent. This metric particularly applies to RealMedia streams.

The packets resent metric, also known as packets resend received, is the number of packets requested again (the packets resend requested metric) and received. This metric particularly applies to RealMedia streams. The packets received normally metric is the number of packets received by the media monitor 125 from the streaming media server 4 without incident. The access/network errors metric is the number of errors due to network problems, such as network congestion or loss of network connection at the DCA 3. This would be a successful negotiation, but an error would exist on the line (similar to a timeout).

The content errors metric is the number of content errors encountered while downloading a URL's contents. For each object that is part of a URL's contents, there is the potential for content error. Content errors are identified by HTTP error codes, such as 404, which indicates that an object was not found. For streaming media this is usually zero. The service errors metric is the number of service errors encountered when downloading a URL. A service error indicates that the download of an object completely failed for some reason. Unlike content errors, service errors are not detected by looking at the HTTP reply code. Service errors include all other kinds of errors such as failure to perform a DNS lookup, inability to connect to an IP address, or premature disconnection from a host.

The current bandwidth is the rate at which data is received measured over a very small time frame. Typically measured in bytes per second. The clip bandwidth is the rate at which data is received measured over the length of the entire stream or over a long predetermined timeframe.

Packet counts are those such as, but not limited to, packets lost, packets received, packets late, packets resend requested, packets resend received, packets recovered, and packets received normally. The packet counts reported by the media monitor 125 can be cumulative counts. For example, if there is one packet lost in each of the first-three seconds of the measurement period, the data collected could be represented in Table 1.

TABLE 1

| Measurement Interval (seconds) | 1 | 2 | 3 |
|---|---|---|---|
| Reported Lost Packet Count | 1 | 2 | 3 |

However, this data may easily be misinterpreted by the user presented in this form. For example, in the second measurement interval, a user may erroneously believe that two packets were lost rather than one. Therefore, this data may be converted into the packets lost during each measurement interval, also referred to as the "instantaneous count". The converted data from Table 1 could be represented as shown in Table 2.

TABLE 2

| Measurement Interval (seconds) | 1 | 2 | 3 |
|---|---|---|---|
| Reported Lost Packet Count | 1 | 2 | 3 |

This conversion calculation can be expressed as $$x_i' = x_i - x_{i-1}$$

where $x_i'$ is the reported lost packet count for interval i, $x_i$ is the total lost packet count through interval i, and $x_{i-1}$ is the total lost packet count through interval i−1. This calculation is may be performed when the data is passed back through the COM component 30, but may alternatively occur at any location capable of at least temporarily storing $x_i$ and $x_{i-1}$ and performing the required subtraction. This calculation may be performed for each packet count metric, including but not limited to: packets lost, packets received, packets late, packets resend requested, packets resend received, packets recovered, and packets received normally. However, if it is desired to perform this calculation on some packet count metrics and not on others, the system can easily achieve that result as well. Presenting packet data in the above-described format prevents user confusion between interval-specific metrics and cumulative metrics.

The COM component 30 (or other capable software) may also be configured to perform a cumulative bytes received calculation, which is a cumulative total of the amount of data (e.g., in bytes) received during the measurement. Assuming that the bandwidth is the rate at which data is received in bytes per second, this can be expressed as:

$$y_i = y_{i-1} + (z_i * t)$$

where y is the quantity of data (e.g. number of bytes) measured, i is the measurement interval, z is the current bandwidth (e.g., bytes per second), and t is the time length of interval (in seconds).

Thus, RTM systems and methods designed in accordance with the various embodiments of the invention provide increased utility including, but not limited to, cost savings, increased speed of data return, reduced system complexity, reduced required processor capacity, and reduced space (both physical and memory) needed.

As explained above, various embodiments of the invention provide systems and methods for real-time measurement of streaming media and other data content delivery metrics. Such systems and methods may have increased utility in that they enable achievement of system scalability by threading the engine core. For example, the various systems and methods of the invention may be implemented using Real Networks®' Software Development Kit (SDK) that provides an API for accessing the components of their media player. This SDK is primarily intended for use by developers building custom user interfaces while relying on Real Networks® streaming technology to deliver content. Although SDK is for C/C++ developers, it has utility even when used with a monitoring framework implemented entirely in Java because it is possible to interact between the two languages in a single process via JNI (Java Native Interface).

A first step in achieving scalability (defined here as being able to simultaneously measure multiple media streams in a single process) may be to activate Real Networks' "core" by sending in a Java thread via a JNI call. The thread may stay in this native code (a dynamic link library written in C++) essentially in an endless loop where it may wait for commands from the controlling layer (Java code).

When the controlling code receives a monitoring request it may send a thread through the JNI layer into the native code where it may communicate with the "core" thread via a PostThreadMessage( ) operation (PostThreadMessage is part of the Win32API provided by Microsoft®). This may enable the capability to launch multiple steaming monitors, but it does not enable the ability to control players or collect associated statistics. Control and collection is handled by the engine core; however, there are no default mechanisms for either controlling individual players or getting the correct statistics back to the Java control layer. In accordance with the invention embodiments, the identification mechanisms (numerical Ids) used in the Java layer are associated with a data structure encapsulating IDs with player objects. As a result, the PostThreadMessage operation may take three arguments: the message and two "message parameters". It is possible to use the message parameters to transmit ID information along to the core engine thread, which can then store this in a data structure encapsulating these values and the player object.

Systems and methods designed in accordance with various embodiments of the invention may obtain statistical information from the engine core by providing an IRMCAClientAdviceSink interface and implementing an OnStatisticsChanged method, which is standard to SDK. These operations obtain a statistic from the engine core and provide it in the native layer but not into the Java layer where it is needed. For this reason, the systems and methods designed in accordance with the various embodiments of the system initiate a JNI call with the statistic and the ID information previously transmitted. For scalability reasons, the statistic is pushed on a queue existing at the lava layer (or JVM), which is then processed by an event thread. The event thread processes this queue, passing the statistic to every currently active Java player thread (each player at the Java controller layer is represented by a Java thread). The object running on this thread then checks the statistic ID against the ID information communicated earlier. If it is a match, it accepts the statistic, otherwise it is ignored.

Further details as to the use or other aspects of the system and method described herein may be drawn from the background that is intended to form part of the present invention. That is to say, all aspects described in the background, including those described and labeled as not being the invention, are described as and capable of being incorporated into the invention. Aspects labeled as not being the invention are merely not the invention as they stand in their own entirety as described, but their aspects are not precluded from being aspects of the present invention.

It is noted that this invention has been described and specific examples or variations of the invention have been portrayed. The use of those specific examples is not intended to limit the invention in any way. Additionally, to the extent that there are variations of the invention, which are within the spirit of the disclosure and are equivalent to features found in the claims, it is the intent that the claims cover those variations as well. All equivalents are considered to be within the scope of the claimed invention, even those which may not have been set forth herein merely for the sake of relative brevity. Furthermore, it is contemplated that each and every optional feature of the inventive variations described herein may be specifically excluded from the invention claimed and be so-described as a negative limitation. Also, the various aspects of the invention described herein, in any manner, may be modified and/or used in combination with such other aspects also described to be part of the invention either explicitly, implicitly or inherently to form variations considered to be part of the invention.

We claim:

1. A streaming media measuring system, comprising:
a web server; and
a plurality of user-selectable agents;
wherein the web server is connected directly through a network to each agent, wherein each agent is configured to measure data from a media stream responsive to a user selecting the agent for the media stream, and to transmit the data to the web server, and
wherein the agent and web server cooperate to provide a user, prior to storing the performance characteristics in a storage database, with real-time performance characteristics associated with the media stream web in response to specific requests from the user.

2. A computer network for transmitting a streaming media, comprising:
a web server; and
a plurality of user-selectable agents in communication with the web server;
wherein each agent is configured to measure data from a media stream selected by a user for the respective agent, and to transmit the data to the web server, and
wherein the respective agent and the web server cooperate to provide a user with real-time performance characteristics associated with the media stream in response to specific requests from the user, and prior to storing the performance characteristics in a storage database.

3. A method of measuring performance data of a media stream, comprising:
responsive to a user request to measure performance characteristics of the media stream, obtaining the media stream from a streaming server;
measuring at least some of the performance parameters characterizing the media stream using a data collection agent selected by the user from a plurality of data collection agents;
receiving the media stream by the data collection agent coupled to the streaming server;
transferring at least some of the performance parameters from the data collection agent to a web server; and
transferring the at least some of the performance parameters from the web server to a requesting user terminal,
wherein the data collection agent and web server operate in combination to provide the user terminal with the performance parameters in real-time, prior to storing the performance characteristics in a storage database.

4. The method of claim 3, further comprising formulating a report of the user terminal, wherein the report comprises information regarding at least one performance parameter.

5. A method as in claim 3 wherein the performance parameters comprise one or more measurements selected from the group comprising:
Domain Name System ("DNS") time, first stat time, buffering time, quantity of data received, jitter, percent packet loss, packet loss, packets received, packets late, packets resend requested, packets resend received, packets recovered, packets resent, packets received normally, access/network errors, content errors, service errors, current bandwidth, clip bandwidth, and bandwidth ratio.

6. A method as in claim 5 wherein the performance parameters measured are selected based at least in part on the user request.

7. A system for measuring parameters of a media stream, comprising:
- a plurality of data collection agents, each configured to selectively couple with at least one user-designated media stream and to collect data associated with the user-designated media stream, wherein the user designation is stored in a preference set;
- a web server configured to communicate with the data collection agents and to obtain a request from a user for measurement of a user-designated media stream by a user-designated data collection agent, the user request including an identification of the media stream and a list of one or more performance parameters of the stream to be measured;
- wherein the user-designated data collection agent is further configured to receive from the web server a parameter set defining a measurement of the user-designated media stream, and wherein the data collection agent is further configured to collect and measure media stream data according to the parameter set, and wherein the data collection agent is further configured to provide the user real-time performance characteristics associated with the user-designated media stream prior to storing the performance characteristics in a storage database.

8. The system of claim 7, further comprising a user terminal coupled to the web server and configured to formulate the parameter set defining the measurement of the user-designated media stream.

9. The system of claim 8, wherein the user-designated data collection agent is configured to transmit collected media stream data to the web server.

10. A system as in claim 7 wherein data measured by the user-designated data collection agent comprise one or more measurements selected from the group comprising:
Domain Name System ("DNS") time, first stat time, buffering time, quantity of data received, jitter, percent packet loss, packet loss per time period, packet loss, packets received, packets late, packets resend requested, packets resend received, packets recovered, packets resent, packets received normally, access/network errors, content errors, service errors, current bandwidth, clip bandwidth, and bandwidth ratio.

11. The system of claim 10, wherein data measured by the data collection agent comprises at least one measurement of each of Domain Name System ("DNS") time, first stat time, buffering time, quantity of data received, jitter, percent packet loss, packet loss per time period, packet loss, packets received, packets late, packets resend requested, packets resend received, packets recovered, packets resent, packets received normally, access/network errors, content errors, service errors, current bandwidth, clip bandwidth, and bandwidth ratio.

12. The system of claim 7, wherein the user-designated data collection agent is further constructed and adapted to provide the user with real-time performance characteristics associated with the media stream by sending the performance characteristics to the web server prior to any storing of the performance characteristics in a database.

13. The system of claim 7, wherein the user-designated data collection agent is further constructed and adapted to provide the user with real-time performance characteristics associated with the media stream by transmitting the characteristics directly over a socket connection to the web server.

14. The system of claim 13, wherein the direct transmission does not pass through an agent interface server, ingestor, or database.

15. The system of claim 7, wherein a parameter of the parameter set is a measurement time period, and wherein the selected measurement time period is less than the length of the user-designated streaming media.

16. The system of claim 7, wherein the agent is further constructed and adapted to collect and measure media stream data a plurality of times during the transmission of the media stream, and wherein the agent is further constructed and adapted to provide the user with real-time performance characteristics a plurality of times during the transmission of the media stream.

17. A computer network comprising a system for measuring parameters of a media stream, the streaming media measuring system comprising:
- a web server to receive user input for measurement of user-designated media streams, the user requests identifying the media stream and a list of one or more performance parameters of the stream to be measured;
- a plurality of data collection agents, each provided in communication with the web server, the web server to receive user input identifying a particular data collection agent for measuring the user-designated media stream, each data collection agent responsive to communication from the web server identifying a parameter set including the performance parameters of the user input, the data collection agents to collect and measure media stream data according to the respective parameter set and to provide to a requesting user real-time performance characteristics associated with the respective media stream, prior to storing the performance characteristics in a storage database.

18. A system for measuring parameters of a media stream, comprising:
- a web server to receive user requests for measurement of user-designated media streams, the user requests identifying the media stream and a list of one or more performance parameters of the stream to be measured;
- a plurality of data collection agents, each provided in communication with the web server and based on user input, each provided in association with at least one media stream and, each data collection agent responsive to communication from the web server identifying a parameter set including the performance parameters of the user request, the data collection agents to collect and measure media stream data according to the respective parameter set and to provide to a requesting user real-time performance characteristics associated with the respective media stream, prior to storing the performance characteristics in a storage database.

19. The system as in claim 18, wherein the performance parameters include one or more of:
Domain Name System ("DNS") time, first stat time, buffering time, quantity of data received, jitter, percent packet loss, packet loss per time period, packet loss, packets received, packets late, packets resend requested, packets resend received, packets recovered, packets resent, packets received normally, access/network errors, content errors, service errors, current bandwidth, clip bandwidth, and bandwidth ratio.

20. The system as in claim 18, wherein the providing of real-time performance characteristics is done prior to the real-time performance characteristics passing through any of: an agent interface server, an ingestor, or a database.

* * * * *

UNITED STATES PATENT AND TRADEMARK OFFICE
CERTIFICATE OF CORRECTION

PATENT NO. : 7,647,418 B2 Page 1 of 1
APPLICATION NO. : 10/174481
DATED : January 12, 2010
INVENTOR(S) : Ash et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1601 days.

Signed and Sealed this

Sixteenth Day of November, 2010

David J. Kappos
*Director of the United States Patent and Trademark Office*